(12) United States Patent
Martin

(10) Patent No.: US 8,068,006 B2
(45) Date of Patent: Nov. 29, 2011

(54) METHOD OF DETECTING PRESENCE AND MOTION FOR DOOR CONTROL DEVICES AND DOOR CONTROL DEVICES IMPLEMENTING SUCH A DEMAND

(75) Inventor: Christian Martin, St. Martin l'Hortier (FR)

(73) Assignee: CELEC Conception Electronique, Neufchatel-en-Bray (FR)

( * ) Notice: Subject to any disclaimer, the term of this patent is extended or adjusted under 35 U.S.C. 154(b) by 1218 days.

(21) Appl. No.: 11/791,714

(22) PCT Filed: Dec. 22, 2005

(86) PCT No.: PCT/EP2005/057123
§ 371 (c)(1),
(2), (4) Date: May 29, 2007

(87) PCT Pub. No.: WO2006/067222
PCT Pub. Date: Jun. 29, 2006

(65) Prior Publication Data
US 2008/0117020 A1    May 22, 2008

(30) Foreign Application Priority Data
Dec. 23, 2004    (FR) .................................... 04 53195

(51) Int. Cl.
*G06F 7/00*    (2006.01)
(52) U.S. Cl. .......... 340/5.7; 382/115; 348/156; 348/143
(58) Field of Classification Search ................ 340/5.7
See application file for complete search history.

(56) References Cited

U.S. PATENT DOCUMENTS

| | | | |
|---|---|---|---|
| 6,185,343 B1 * | 2/2001 | Ikeda et al. | 382/291 |
| 6,507,278 B1 * | 1/2003 | Brunetti et al. | 340/541 |
| 6,591,006 B1 * | 7/2003 | Niemann | 382/162 |
| 6,720,874 B2 * | 4/2004 | Fufido et al. | 340/541 |
| 2001/0021274 A1 * | 9/2001 | Lee | 382/240 |
| 2002/0067259 A1 * | 6/2002 | Fufido et al. | 340/541 |
| 2005/0249382 A1 * | 11/2005 | Schwab et al. | 382/115 |

FOREIGN PATENT DOCUMENTS
EP    1313321    5/2003
* cited by examiner

*Primary Examiner* — Jennifer Mehmood
*Assistant Examiner* — Naomi Small
(74) *Attorney, Agent, or Firm* — Young & Thompson

(57) ABSTRACT

A method of detecting presence and motion for door control devices, and a door control device implementing the method. On receipt of a door opening command (24), at least a portion of at least one image captured by a digital camera of the floor area is compressed (28) and the compressed image is compared (32) with at least one active presence criterion to inhibit or not inhibit the door closure command (34).

18 Claims, 5 Drawing Sheets

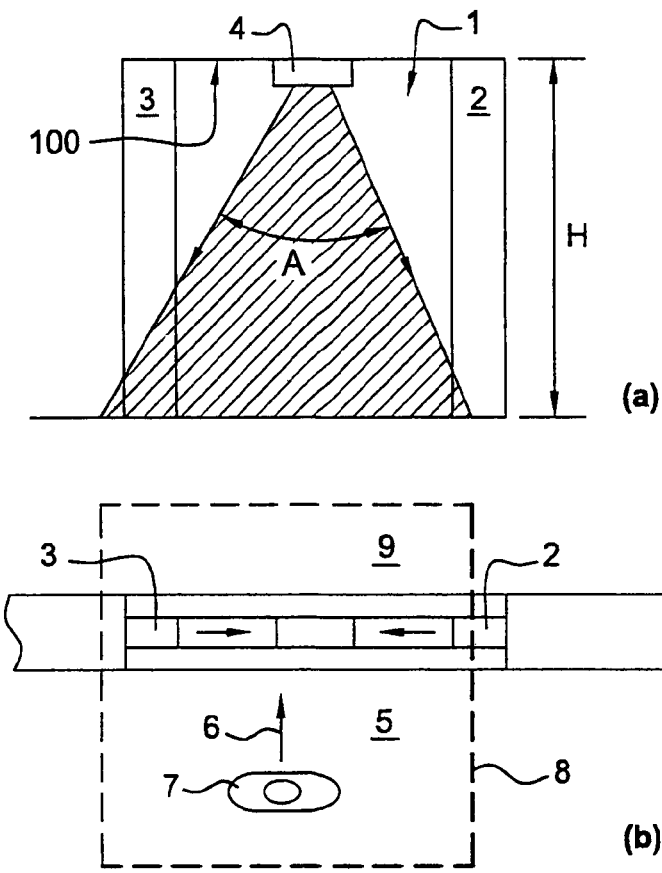
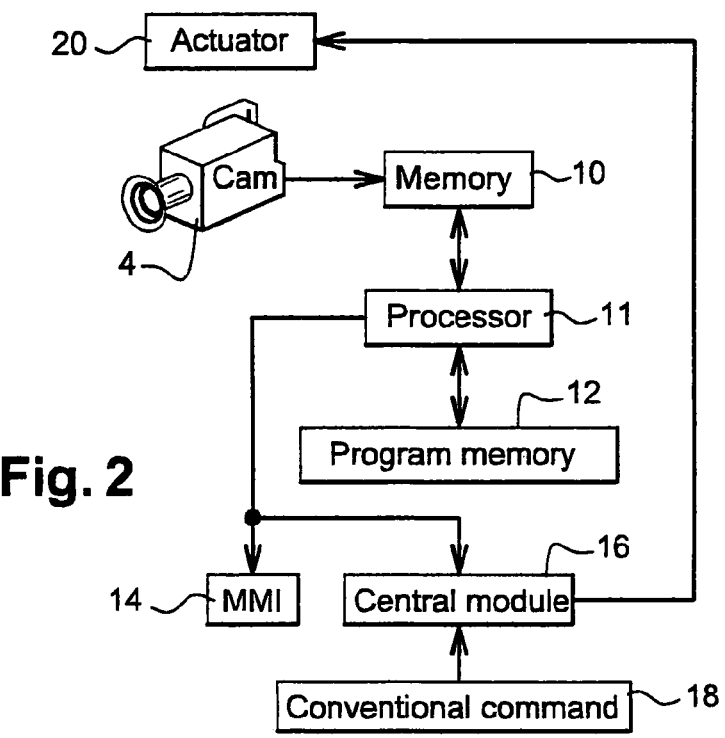
Fig. 1
Fig. 2

METHOD OF DETECTING PRESENCE AND MOTION FOR DOOR CONTROL DEVICES AND DOOR CONTROL DEVICES IMPLEMENTING SUCH A DEMAND

BACKGROUND OF THE INVENTION

1. Field of the Invention

The invention relates to a method of detecting presence and motion for door control devices. It also relates to a door control device implementing the method of the invention.

2. Description of the Related Art

In the state of the art, the use of techniques based on the use of real images to control the opening and/or closing of a door control device, for example a lift door, has already been proposed.

Reference should be made to patent WO-A1-03/097506 which discloses a camera for detecting obstructions in the opening path of lift doors. The camera includes means for continuously recording video images, each recorded image being converted by image conversion means into a numerical vector. Then, a neurone network for recognizing obstructions is used to produce an alarm signal in order to control the opening and the closing of a door. Now, recognition by neurone network is a complicated technique that is difficult to implement in random lighting conditions.

Reference can also be made to document WO-A1-03/010719 which discloses a device for controlling access to a door. An analogue television camera is connected by its video signal output to a circuit for detecting an edge in upward or downward motion in an analogue video signal. Detection on an analogue video signal is a technique sensitive to radiofrequency noises.

SUMMARY OF THE INVENTION

The present invention adds a refinement to this state of the art.

In practice, the present invention relates to a method of detecting presence and motion for door control devices of the type implementing a camera for capturing, in at least one spectral zone (visible light, infrared), digital images including at least one image plane and in analysing the information in at least one image or image plane.

The method of the invention consists in:
capturing at least one digital image, of at least one floor area in which the door installation is disposed, in a digital memory in the form of at least one two-dimensional matrix of pixel values which is representative of at least one image signal component (Y; R, G, B; Y, Cr, Cb);
executing a compression of at least one captured image or image plane so as to adapt it to a given memory capacity and to a given resolution in the floor area;
executing a comparison of at least one portion of the compressed image or image plane with at least one comparison value established on the basis of an active presence criterion to produce an inhibition signal controlling at least one door control device; and
deducing from this a door control device control decision.

According to an aspect of the invention, the compression step includes a step for selecting determined dimensions of an individual block based on the requested resolution at least in a floor area, the aperture of the image sensor and the dimensions of the image field, and the available memory size.

According to an aspect of the invention, the compression step consists in calculating the average value of a characteristic of an image signal, such as the brightness, in each individual block.

According to an aspect of the invention, the comparison step includes a step for calculating the inter-block difference between the reference image and the second image.

According to an aspect of the invention, the comparison step also includes a step for comparing at least one inter-block difference value with a predetermined threshold value, Threshold: $\Delta Y > Threshold$, such that if the inter-block difference value exceeds the predetermined threshold "Threshold", a signal detecting motion in the second image is produced.

According to an aspect of the invention, said threshold value is adjusted according to the relation:

$$Threshold = Threshold\_0 + tl*K$$

in which the brightness ratio tl is determined by the relation:

$$tl = \frac{Lm}{Lm - Ym}$$

Threshold_0 is a threshold offset value and K is a coefficient, both of which are determined on installation on a particular door control device by successive tests in order to cancel out the error ratio of the active detection test.

According to an aspect of the invention, the image capture is sequential and the reference image is reloaded periodically.

According to an aspect of the invention, the floor area determination step includes:
a step for determining door pillars by producing at least two lines representing the pillars;
a step for determining a line joining the ends of the reproducing lines representing the pillars;
a step for dimensioning in the orthogonal direction a rectangle determining floor area.

According to an aspect of the invention, a step for calculating a gradient in the compressed image of the floor area is included.

According to an aspect of the invention, the active presence detection step includes a step for comparing at least one gradient value in the compressed image of the floor area with a predetermined threshold.

According to an aspect of the invention, the step for comparing at least one gradient value is preceded by a threshold calculation and/or adaptation step.

According to an aspect of the invention, the gradient calculation step includes a step for calculating two gradients in orthogonal directions to detect forward and/or sideways motions.

According to an aspect of the invention, the detection of forward and/or sideways motions is executed by searching for the positions of the maxima of the two gradients, then by calculating the variations of the positions of the maxima at predetermined reference values and by comparing the two position variations to deduce from this whether the motion in the image is forward or sideways to deduce from this a decision to inhibit a closure command.

According to an aspect of the invention, a step for calculating reference values by assigning, in a sequence of processed images, at least one value captured previously for each of the positions of the maxima of the gradients is included.

According to an aspect of the invention, provision is made for determining at least one of the active presence detection criteria:

detection of presence;
detection of motion;
detection of forward or sideways motion.

The invention also relates to a door control device of the type including at least one digital image matrix sensor coupled with a two-dimensional memory of pixel values. The door control device includes:

at least one processor for executing the compression of the captured image in memory;

at least one processor for producing a decision signal to execute the door control device command on the basis of a predetermined active presence decision criterion; and a circuit controlling the closure of the door control device sensitive to an active presence decision signal that is produced.

BRIEF DESCRIPTION OF THE DRAWING FIGURES

Other features and advantages of the present invention will be better understood using the description and appended figures, in which:

FIG. 1 represents in the diagram (a), a front view and, in the diagram (b), a top view to schematically illustrate the implementation of a landing door control device for a lift;

FIG. 2 is a block diagram of a door control device implementing the method of the invention;

FIG. 1 shows a representation of a door control device suited to a lift landing door which separates a landing in a building from a lift car.

DETAILED DESCRIPTION OF THE INVENTION

Figure 3:
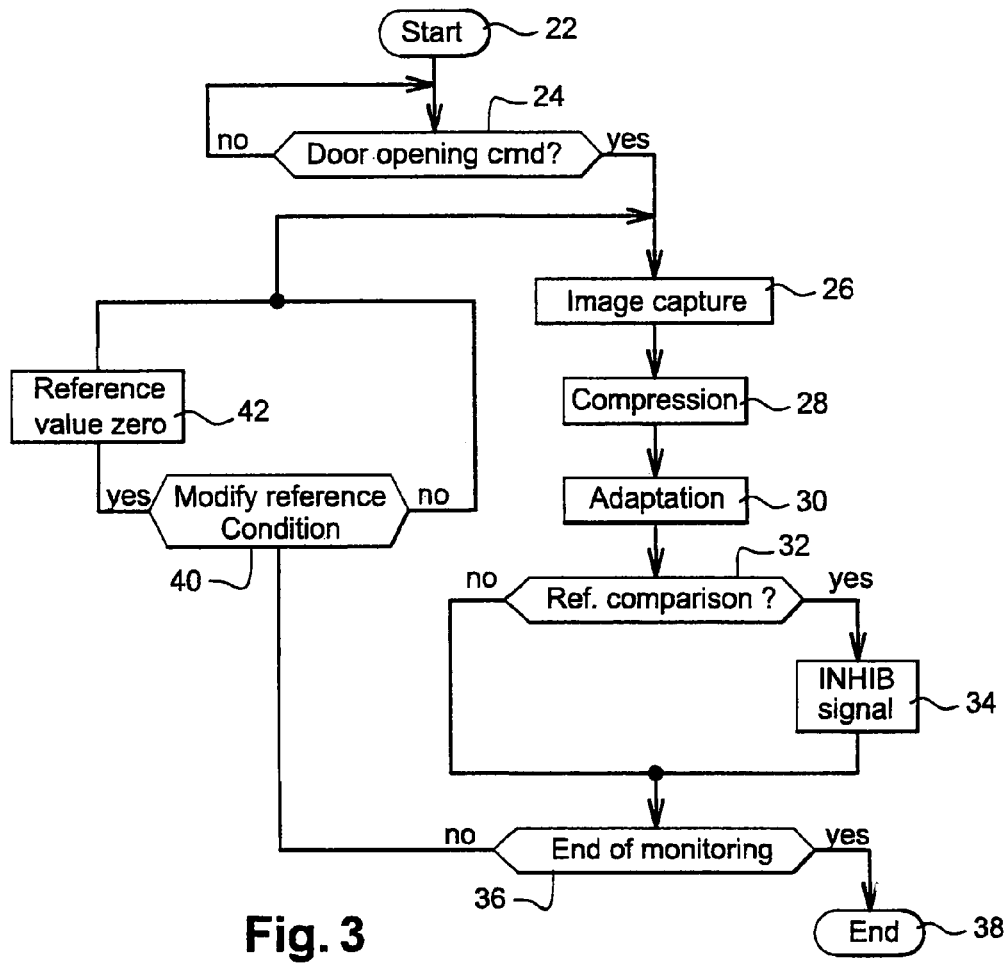
FIG. 3 represents a first flow diagram of the method of the invention.

The lift landing door 10 comprises two moving parts 2 and 3 in an opening 100 which provides access to the landing from the lift car when the latter is at the floor on which the door control device is installed, or provides an exit from the car.

In the top part of the door control device, there is a digital camera 4 intended to capture a digital image of the floor area and of the opening area according to a beam of aperture A with a central axis roughly vertical and directed towards the floor. The digital camera 4 is disposed at a determined height H from the floor.

In the diagram (b) of FIG. 1, the same elements are given the same reference numbers and are not described further.

The landing area 5 is defined in the image field 8 on the floor complemented by an area inside the car 9. To this end, the camera 4 is oriented so as to obtain an unbalanced image field favouring the approach area 5 in the landing area.

A person 7 who moves here towards the door opening to access the car, according to the arrow 6, can be detected by the method of the invention.

If a door opening command is currently being executed, an inhibition signal can, as an example, be produced to prevent the closure from continuing and return the door to the open position.

In the invention, at least one image capture camera is provided. The images can be single or be associated in a video sequence. They are captured in at least one spectral zone, for example over one or more linked or separate parts in visible light or in infrared light. The infrared type images can originate from the heat radiated by the bodies located in the image field or even originate from an illumination using an illumination generator. The captured digital images comprise at least one image plane and the information in at least one image or image plane is analysed.

FIG. 2 shows a representation of a door control device implementing the method of the invention.

A digital image capture camera 4 produces a digital signal so as to capture a matrix of image dots or pixels which is stored in a matrix memory 10 in which the pixels are arranged, for example, in the form of a rectangular array. Other arrangements are possible, such as a hexagonal arrangement of the pixels according to the resolution and the operations envisaged.

A processor 11 applies the processes defined using the method of the invention under the control of a program memory 12.

A user interface 14 (man-machine interface MMI) is used to configure the processor 11, on the one hand, and, on the other hand, to receive the signals resulting from control operations.

The user interface 14 also includes means for displaying on the landing or inside the lift car the active presence and/or motion detection state.

Similarly, the processor 11 addresses control messages to a central module 16 which produces or does not produce a command signal to open or close the automatic door.

The automatic door is operated by means of an actuator 20. The actuator 20 can be split into two to operate the two moving parts 2 and 3 of the door of the exemplary embodiment of FIG. 1.

Moreover, the central module 16 controlling the opening and/or closing cooperates with a conventional control device 18. The control device 18 is used in particular to take account of the state of the lift control buttons and/or floor arrival safety interlocks.

In particular, in a preferred embodiment, the door opening command is executed on the basis of a command signal from the control device 18, whereas a closure command that it produces is inhibited by the central module 16 if the processor 11, implementing the method of the invention, detects an active presence, for example in the opening area detected in the field of the camera 4 (FIG. 1).

FIG. 3 shows a representation of a flow diagram of a first embodiment of the method of the invention.

The operation of a door control device is described in the context of a purely illustrative assembly. In particular, the door control can result in its opening, its closure or in any predetermined sequence of motions or manoeuvres.

After a start step 22, control switches to a test for detecting the door open command in the step 24.

As long as the door open command is not received, control loops back to the test of the step 24.

When the test 24 is positive ("YES"), control switches to a step 26 for capturing an image.

In a particular embodiment, the image is a luminance image, for example encoded on 8 bits per pixel.

After the capture step 26, an image compression is executed in the step 28.

In this preferred embodiment, the compression step consists in replacing a group of pixels in a block of the image captured in the step 26, for example, so as to represent the average value of the 64 pixels y(i, j) in a block of eight pixels by eight pixels, for example:

$$Y_b(i_0, j_0) = \frac{1}{64} \sum_{j=0}^{7} \sum_{i=0}^{7} y(8i_0 + i, 8j_0 + j)$$

In particular, in the case where the image signal associated with the pixel at the address (i, j) is represented by a number of components, equations of similar form are provided for the other components, for example, if blue chrominance $C_b$ and red chrominance $C_r$ information is added, in which case the two additional equations will be processed likewise:

$$C_{bb}(i_0, j_0) = \frac{1}{64} \sum_{j=0}^{7} \sum_{i=0}^{7} c_b(8i_0 + i, 8j_0 + j)$$

$$C_{rb}(i_0, j_0) = \frac{1}{64} \sum_{j=0}^{7} \sum_{i=0}^{7} c_r(8i_0 + i, 8j_0 + j)$$

in which each pixel (i,j) of the image is represented by the triplet of components (y, $c_b$, $c_r$) originating from the three image planes of intensity Y, blue chrominance $c_b$ and red chrominance $c_r$ and the compressed image is then determined by the triplets ($Y_b$, $C_{bb}$, $C_{rb}$) for each compressed pixel (i0, j0).

In the method of the invention, the size of the blocks, which is eight pixels by eight pixels in the above example, is selected according to various factors, including:

the memory size available in the image memory;
the minimum resolution desired in the floor area monitored in the field of the camera;
the size of the image captured by the camera.

Once the image is compressed in the step 28, the processing is adapted in a step 30 to adjust the various parameters used to execute the active presence detection and which are described later.

Control then switches to a step 32 for execution of a test for detecting the active presence of at least one block obtained using the step 28. In a preferred embodiment, the active presence detection test is executed using the comparison of at least one image block with a reference derived from an active presence of an object that can be static or moving in the floor area.

In the test carried out in the step 32, at least one block captured in the compression step 28 is compared with a condition for detecting an active presence including:

a presence element;
a motion element.

Each active presence detection condition is determined on the basis of parameters that were adapted in the preceding step 30.

If the active detection test 32 is negative ("NO"), control switches to a test step 36 for testing the end of monitoring.

If the test in the step 32 is positive ("YES"), an inhibition signal is set to the active state in a step 34, preventing the closing of the door, even if a door open command is generated by the closure control device.

Control also returns to the end-of-monitoring test 36.

The end-of-monitoring test 36 is executed when the door control device has produced a closure control signal and this closure has been executed, in which case, control switches to the end-of-monitoring step 38.

If the end-of-monitoring test 36 is negative ("N"), control returns to a step 40 for testing a condition for modifying parameters for performing an active presence detection, in the step 32.

If, the test 40 is negative, control returns to the image capture loop at the input of the step 26.

If the test 40 is positive ("Y"), a new reference value, or a new active presence detection parameter, is calculated in a step 42 and control also returns to the input of the step 26.

Figure 4:
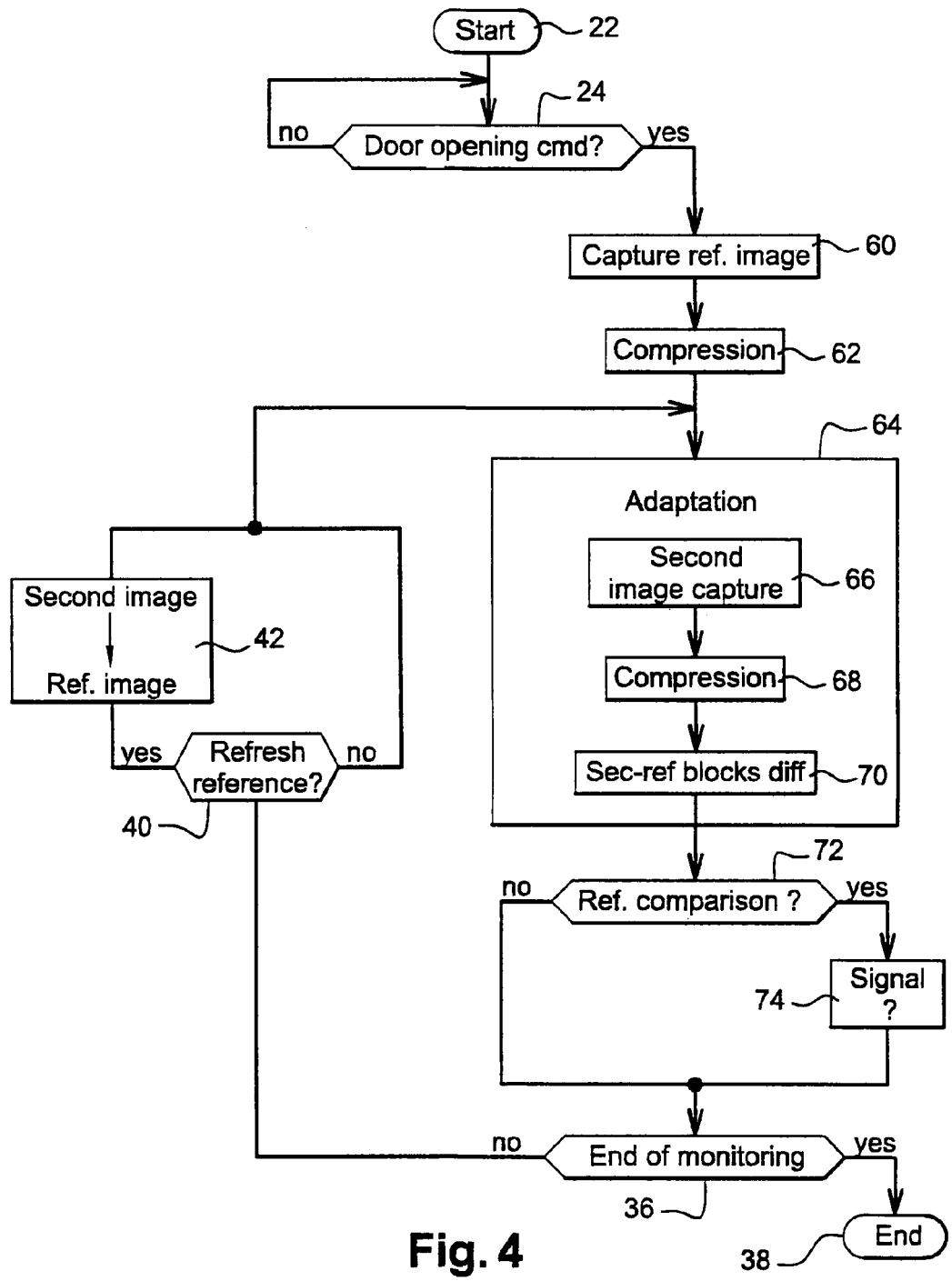
FIG. 4 represents a second flow diagram of the method of the invention.

FIG. 4 shows a representation of another embodiment of the method of the invention.

The same elements as those in FIG. 3 are given the same reference numbers, and will not be described further.

In a step 60, a reference image is captured in conditions similar to those of the capture in the step 26 (FIG. 3).

Each pixel of the reference image is designated $b_{ref}(i, j)$.

Once the image is captured in the form of a matrix, the image is compressed in blocks, in a step 62, as has already been explained for the step 28 (FIG. 3).

The reference image is therefore made up of pixels, each of which is expressed by a relation in the form:

$$B_{ref}(i,j) = \text{block}(\text{size}, b_{ref}(i,j))$$

in which block( ) is a function like the one indicated for the compression of the step 28 (FIG. 3).

In a step 64 similar to the step 30 of FIG. 3, first of all, in a step 66, a second image is captured which, in a sequence of images produced by the camera, is a second image that appears after the capture of the reference image, or of any other subsequent second image.

Each pixel of the second image is designated $b_2(i, j)$.

This second image is in turn compressed in a step 68 identical to the compression of the step 62.

A pixel running through the second image is therefore made up of pixels, each of which is expressed by a relation of the form:

$$B_2(I,J) = \text{block}(\text{size}, b_2(i,j))$$

in which block( ) is a function like the one indicated for the comparison of the step 28 (FIG. 3).

An image is then produced, consisting of the block-for-block difference between the reference image captured in the step 60, 62 and the second image captured in the step 66, 68 similar to the test of the step 32, in a step 70.

A pixel D(I, J) of the difference image is therefore determined by the relation:

$$D(I,J) = B_{ref}(I,J) - B_2(I,J).$$

In an active detection test step 72, the difference image is compared with threshold values which can be set in an intermediate step, not represented in FIG. 4, and similar to the abovementioned step 30 (FIG. 3).

Depending on the result of the comparison 72, if the comparison is positive, a signal inhibiting the close command is produced in the step 74.

Otherwise, control switches to an end-of-monitoring test in the step 36. Then, as has already been described using FIG. 3, there is a return to a step for modifying the conditions for detection of an active presence by refreshing a reference if the reference image needs to be refreshed, in a step similar to the step 42 of FIG. 3. The compressed blocks $B_{ref}$ (I, J) of the second image are transmitted to the memory of compressed blocks of the reference image to form a new reference image.

In a particular embodiment, this refreshing is executed periodically.

In another embodiment, the refreshing is decided on the basis of a variation in the ambient brightness detected by a particular sensor, or on the basis of a calculation based on the average lighting in the image field on capturing the second image by calculating the average value of the blocks $B_2$ (I, J).

The average brightness, if $B_2$ is a second luminance image, is expressed by:

$$Y_{average} = \frac{1}{N_{blocks}} \sum_I \sum_J B_2(I, J)$$

if the second image has been compressed into $N_{blocks}$ blocks.

In a particular embodiment, to overcome problems associated with the lighting variations in the field of the image, particularly because of the lighting of the lift cars, the average lighting value $Y_{average}$ of the second image is determined in the step 64. This value is displayed on the user interface 14 (FIG. 2). Then, a brightness ratio tl is calculated in relation to a median luminance value $L_m$. For example $L_m$=128 for an image digitized by pixels on 8 bits.

In an example, the brightness ratio is determined by the relation $$tl = \frac{Lm}{Lm - Ym}$$

In a subsequent step, a threshold value is then determined for the test of the step 70, in the form:

Threshold=Threshold_0+tl*K.

In this relation, Threshold_0 is a threshold offset value and K is a coefficient, both of which are determined on installation on a particular door control device by successive tests designed to cancel out the error ratio of the active detection test 72.

Figure 5:
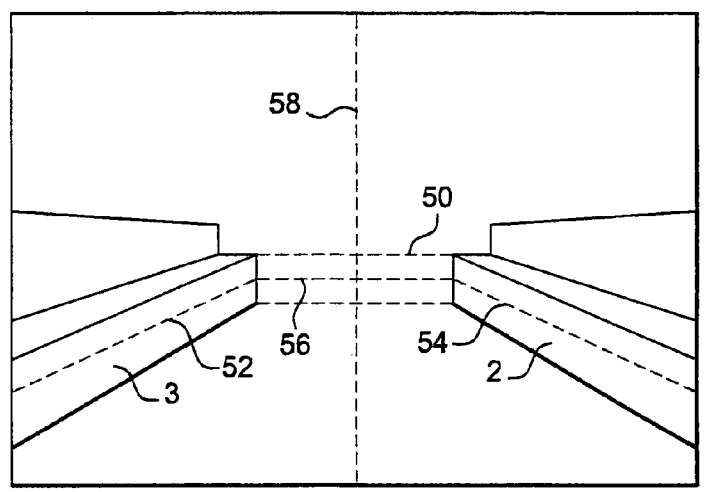
FIG. 5 represents elements taken into account in another embodiment of the method of the invention.

FIG. 5 shows a representation of the image field detected in a particular embodiment of a door control device according to the invention.

The same elements as those in FIG. 1 are given the same reference numbers.

The digital image capture camera is fixed on a part of the door installation, disposed above the door opening, outside the field of the image that it captures. The camera is not therefore represented in FIG. 5.

A threshold area 50 is determined on the floor on the basis of the calculation of a line representative of the right pillar 2 and of a line representative 54 of the left pillar 3 of the door opening in the open position of its panels when it is controlled by the method of the invention.

A line 56 links the ends of the lines 52, 54 in the floor area and is used to generate a rectangular area 50, the extension of which can be determined on configuring the automatic door installation. This line 56 is calculated by the method of the invention on the basis of the calculation of the abovementioned lines 52 and 54.

The lines 52 and 54 are calculated in an initialization phase when it is certain that no obstacle is located in the threshold area 50. To this end, the side pillars are detected by the detection of two side zones in the image which, for a luminance image, present a uniformity of brightness on a scan in the horizontal direction of the image. These two consistency areas are then "refined" to produce the lines 52 and 54 representing the side pillars using an image processing operation within the scope of those skilled in the art.

A horizontal central axis 58 is detected on orienting the camera.

The dimension according to the axis 58 of the rectangle centred on the line 56 is then determined by the user using the interface 14 (FIG. 2).

These various parameters can be adjusted on mounting the camera or using a camera orientation actuator.

Similarly, the extent of the "rectangular" field can be obtained using an adjustment state machine, for example an automatic zoom mounted on the camera lens.

Figure 6:
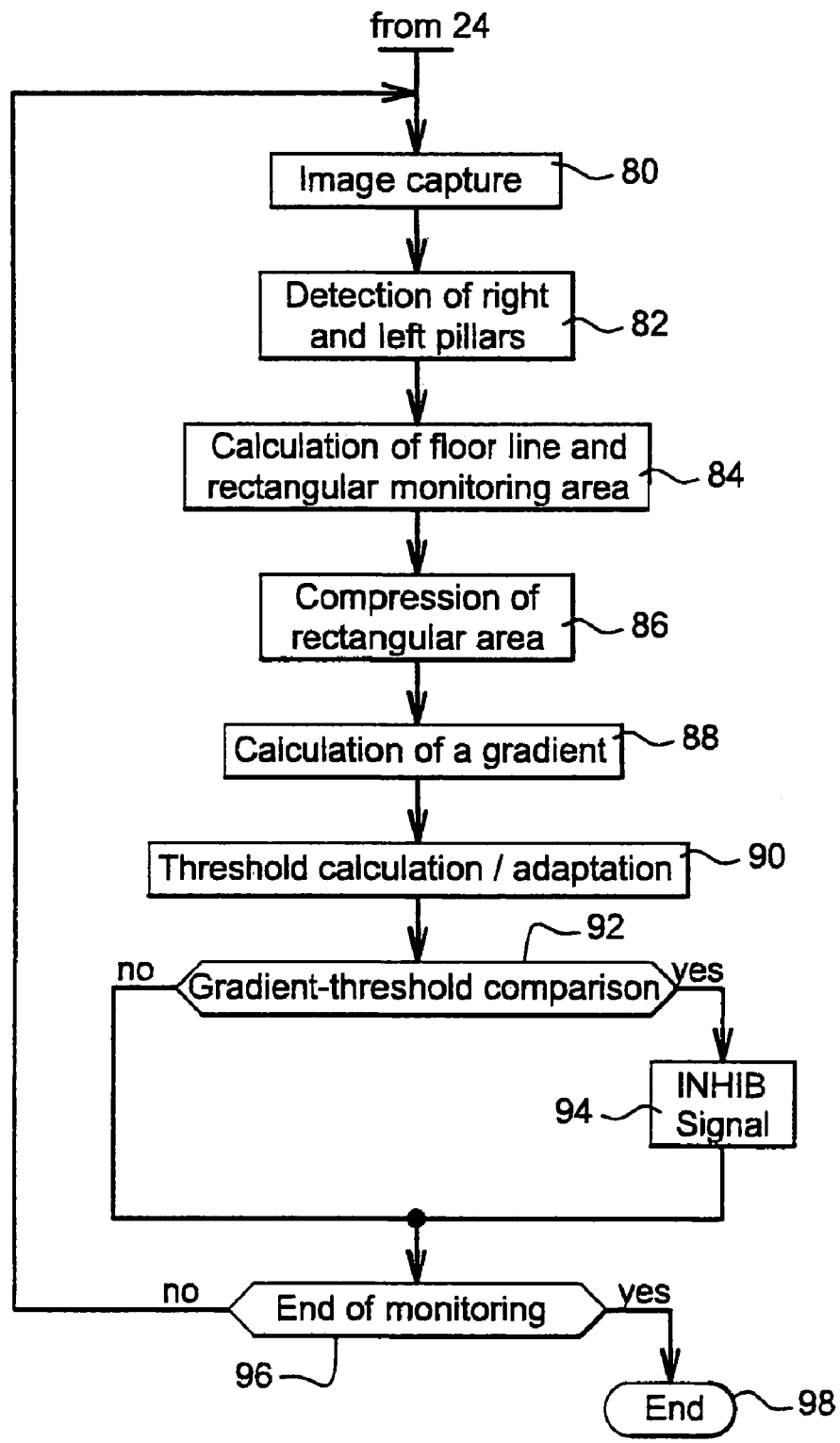
FIG. 6 represents a flow diagram of a third embodiment of the invention.

FIG. 6 shows a representation of another embodiment of the method of the invention that implements the parameters described using FIG. 5.

The same elements as those of the abovementioned FIGS. 3 and 4 are given the same reference numerals and will not be described further.

When the step 24 of FIG. 3 has been executed, in a step 80, an image is captured in matrix form, for example in the form of a brightness matrix of dots or pixels obtained using a matrix sensor.

First of all, in a step 82, the right and left pillars are detected as has been explained using FIG. 5.

In a step 84, there is a calculation of the floor line 56, then that of a rectangular monitoring area 50 as has been explained using FIG. 5. This step may not be carried out on each capture, but only on configuring the installation.

In the step 86, the image of the rectangular monitoring area is compressed in the form of blocks Y(I, J) as has already been explained above.

In a step 88, an image gradient is calculated using the formula:

ΔY(I, J)=Y(I, J)−Y(I', J') in which the position identified by (I', J') is predetermined relative to each reference position (I, J) as is known for the formation of image gradients.

In a step 90, an active presence detection condition, and in particular the detection of a presence, is then calculated or adapted.

In a step 92, the gradient calculated in the step 88 is compared with a presence threshold value "THRESHOLD" set in the step 90. The test 92 can be written in the form δY(I, J)>THRESHOLD, in which THRESHOLD has a value determined, for example, in the step 90.

If the test of the step 92 is positive, in a step 94, a signal inhibiting a door control device close command is produced.

If the test of the step 92 is negative, there is an immediate transition to the end-of-monitoring step 96, and if the end-of-monitoring condition of the step 96 is not ended, there is a return to the capture of a new image in the step 80.

Figure 7:
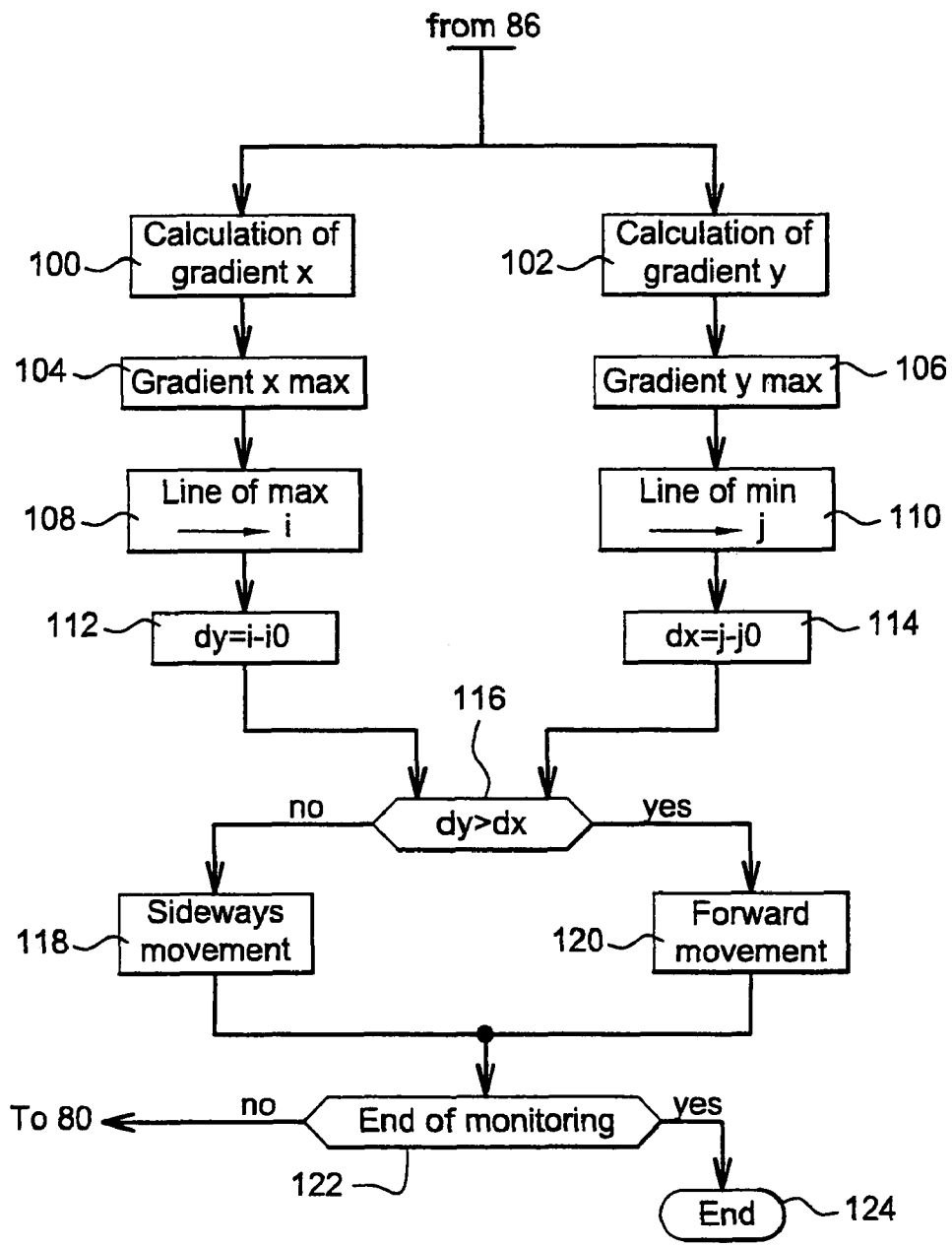
FIG. 7 represents a fourth embodiment of the method according to the invention.

FIG. 7 shows a representation of another embodiment of the method of the invention, in which the image gradient is split into two in a direction parallel to the lines of the image and in the orthogonal direction of the columns of the image B(I, J).

Reference is made to the flow diagram in FIG. 6.

At the end of the step 86, on two parallel paths, the image gradient in the direction X is calculated in a step 100, and the image gradient in a direction Y is calculated in a step 102. If there is only one processor, it is possible to execute these steps sequentially, as is known.

The image gradients in the direction X and in the direction Y are calculated from compressed blocks of the image of the rectangular monitoring area 50 (FIG. 5).

The directions X and Y are determined according to the orientation of the matrix sensor forming the digital camera.

In a step 104, the maximum value of the image gradients calculated in the step 100 is calculated and, in a step 106, the maximum value of the image gradients in the direction Y is calculated.

On the basis of the determination of the maximum values of the X and Y gradients, the column i corresponding to the maximum X gradient determined in the step 104 and the line j of the maximum gradient in the direction Y calculated in the step 106 are respectively determined in the steps 108 and 110.

In a step 112, the variation dY in the horizontal direction is then calculated by subtracting from the value i of the column of the maximum calculated in the step 108 a reference value $i_o$ which will be described later in the step 112, according to the relation $dY=i-i_o$.

In the step 114, the variation dX in the vertical direction is calculated by subtracting from the value j of the line of the maximum determined in the step 110 a reference value $j_o$ which will be described later, according to the relation $dX=j-j_o$.

The variations dX and dY are then compared in a step 116 such that, depending on the result of the comparison, a decision is made, in a step 110, concerning the existence of a sideways motion and in a step 120, concerning the existence of a forward motion, such that, in the case of a sideways motion, the closure command is allowed, and that, in the case of a forward motion, the door control device close command is inhibited.

In an embodiment of the invention, the test of a forward motion is performed on the basis of the evaluation of the condition $dY \geq dX$ which compares the variation dY with the variation dX.

If the condition is false, the motion is sideways.

If the condition is true, the motion is forward.

In an embodiment of the invention, the reference values $i_o$ and $j_o$ used in the step 112 and in the step 114 are established by the values of the maxima i and j calculated on processing an image previously captured and which is used as a reference image. In the same way as has already been explained, this reference image is modified by executing the assignments of variables $i_o=i$ and $j_o=j$ periodically, every eight captured images, or when a predetermined condition for refreshing the reference image is satisfied.

In the above, the image is represented by a two-dimensional matrix of cells, each of which is associated with an integer value, as in the case of a so-called grey-scale image, or even binary image, if the only values allowed are "0" or "1". The invention also applies to the case where the image is represented by other forms of coding, for example colours. In such a case, each cell can be associated with a vector of several colour components such that each cell is associated with a vector type image signal.

Preferably, and according to the knowledge of those skilled in the art, it will be assumed that the image is made up of a number of image planes. For example, in the case of a so-called chrominance colour image, a first image plane is assigned to the light intensity, whereas two other planes are associated with the first chrominance component Cr and the second chrominance component Cb. Moreover, as is known, each plane is made up of a two-dimensional array reproducing the organization of the pixels of the overall image represented, each cell of which presents a determined resolution. Thus, in an example of producing a digitization of chrominance images on eight bits, the invention was executed on an image in three planes 4:2:2 corresponding to an intensity plane on 4 bits, a chrominance plane Cr on 2 bits and a chrominance plane Cb on 2 bits. The description part of the figures can therefore be interpreted as illustrating a distribution in three planes 8:0:0.

The various equations can therefore be written for each pixel component, that is, an equation of the same form is provided for each image plane.

Throughout the description and the claims, when a test is determined on the basis of a single component, but a number of components are processed, the method of the invention includes an additional step for taking decisions based on the majority over all of the components processed such as primary colour components red, green, blue and chrominance components (Y, Cr, Cb).

In a particular embodiment, the method of the invention uses the fact that the chrominance information is two times less sensitive than the luminance or intensity information and that it is thus possible to process all three components to take a decision by majority vote over two byte planes only, a first plane assigned to intensity and the second plane being assigned for half of its resolution to the blue chrominance component Cb and for the other half to the red chrominance component Cr. Thus, the device of the invention can then include only two memories similar to the image processing memory for representing and processing the three image planes.

The invention claimed is:

1. A method of detecting presence and motion for door control devices implementing a camera (4) for capturing, in at least one spectral zone of visible light or infrared light, digital images including at least one image plane and in analysing the information in at least one image or image plane, comprising:
   capturing (26; 60, 66; 80) at least one digital image, of at least one floor area (56) in which the door installation is disposed, in a digital memory in a form of at least one two-dimensional matrix of pixel values which is representative of at least one image signal component (Y; R, G, B; Y, Cr, Cb);
   executing a compression (28; 62; 86) of at least one captured image or image plane so as to adapt the captured image or image plane to a given memory capacity and to a given resolution in the floor area;
   executing a comparison (32; 72; 92; 116) of at least one portion of the compressed image or image plane with at least one comparison value established on the basis of an active presence criterion to produce (34; 74; 94; 118, 120) an inhibition signal controlling at least one door control device; and
   deducing from this a door control device control decision, wherein a floor area determination step includes:
      determining door pillars by producing at least two lines (52, 54) representing the pillars;
      determining a line joining ends of the reproducing lines (52, 54) representing the pillars; and
      dimensioning in the orthogonal direction (58) a rectangle determining the floor area (50).

2. The method according to claim 1, wherein the compression step includes a step for selecting determined dimensions of an individual block based on the requested resolution at least in a floor area, the aperture of the image sensor and the dimensions of the image field, and the available memory size.

3. The method according to claim 2, wherein the compression step consists in calculating the average value of a characteristic of an image signal in each individual block.

4. The method according to claim 1, wherein the comparison step includes a step for calculating the inter-block difference of the reference image and the second image.

5. The method according to claim 4, wherein the comparison step also includes a step for comparing at least one inter-block difference value with a predetermined threshold value, Threshold: ΔY>Threshold, such that if the inter-block difference value exceeds the predetermined threshold "Threshold", a signal detecting motion in the second image is produced.

6. The method according to claim 5, wherein said threshold value is adjusted according to the relation:

$$Threshold = Threshold\_0 + tl*K$$

in which the brightness ratio tl is determined by the relation:

$$tl = \frac{Lm}{Lm - Ym}$$

Threshold_0 is a threshold offset value and K is a coefficient, both of which are determined on installation on a particular door control device by successive tests in order to cancel out the error ratio of the active detection test (72).

7. The method according to claim 1, wherein the image capture is sequential and in that the reference image is reloaded periodically.

8. The method according to claim 1, wherein the method includes a step for calculating a gradient (88) in the compressed image of the floor area (50).

9. The method according to claim 8, wherein the active presence detection step includes a step (92) for comparing at least one gradient value in the compressed image of the floor area with a predetermined threshold.

10. The method according to claim 9, wherein the step for comparing at least one gradient value is preceded by a threshold calculation and/or adaptation step (90).

11. The method according to claim 8, wherein the gradient calculation step includes a step for calculating two gradients (100, 102) in orthogonal directions to detect forward and/or sideways motions.

12. The method according to claim 11, wherein the detection of forward and/or sideways motions is executed by searching (108, 110) for the positions of the maxima of the two gradients (104, 106), then by calculating the variations (dx, dy) of the positions (i, j) of the maxima at predetermined reference values (i0, j0) and by comparing the two position variations (dy>dx) to deduce from this whether the motion in the image is forward or sideways to deduce from this a decision to inhibit a closure command.

13. The method according to claim 12, wherein the method includes a step for calculating reference values (I0, j0) by assigning, in a sequence of processed images, at least one value captured previously for each of the positions (i, j) of the maxima of the gradients.

14. The method according to claim 1, wherein the method includes determining a combination of at least one of the active presence detection criteria:
  detection of presence (60-74);
  detection of motion (80-94);
  detection of forward or sideways motion (100-120).

15. A method of detecting presence and motion for door control devices implementing a camera (4) for capturing, in at least one spectral zone of visible light or infrared light, digital images including at least one image plane and in analysing the information in at least one image or image plane, comprising:
  capturing (26; 60, 66; 80) at least one digital image, of at least one floor area (56) in which the door installation is disposed, in a digital memory in a form of at least one two-dimensional matrix of pixel values which is representative of at least one image signal component (Y; R, G, B; Y, Cr, Cb);
  executing a compression (28; 62; 86) of at least one captured image or image plane so as to adapt the captured image or image plane to a given memory capacity and to a given resolution in the floor area;
  executing a comparison (32; 72; 92; 116) of at least one portion of the compressed image or image plane with at least one comparison value established on the basis of an active presence criterion to produce (34; 74; 94; 118, 120) an inhibition signal controlling at least one door control device; and
  deducing from this a door control device control decision, wherein the method is executed for each component of the image signal (R, G, B; Y, Cr, Cb) and in that it consists in determining a decision by majority vote on each parameter drawn from each component of the image signal.

16. The method according to claim 15, wherein the method includes associating, in one and the same plane of a given resolution, at least two components of resolutions at most equal to the given resolution then in executing the steps on the basis of said image planes.

17. A door control device including at least one digital image matrix sensor coupled with a two-dimensional memory of pixel values, comprising:
  at least one processor for executing the compression of the captured image in memory;
  at least one processor for producing a decision signal to execute the door control device command on the basis of a predetermined active presence decision criterion;
  a circuit controlling the closure of the door control device sensitive to an active presence decision signal that is produced; and
  a memory for each image plane, the image signal components of lower resolutions being associated in one and the same image plane, and the device includes a means for executing decisions on majority vote for all of the image planes processed.

18. The method according to claim 3, wherein the characteristic of the image signal is brightness.

* * * * *